US005179639A

United States Patent [19]
Taaffe

[11] Patent Number: 5,179,639
[45] Date of Patent: Jan. 12, 1993

[54] COMPUTER DISPLAY APPARATUS FOR SIMULTANEOUS DISPLAY OF DATA OF DIFFERING RESOLUTION

[75] Inventor: James L. Taaffe, Arlington, Mass.

[73] Assignee: Massachusetts General Hospital, Boston, Mass.

[21] Appl. No.: 537,331

[22] Filed: Jun. 13, 1990

[51] Int. Cl.⁵ .............................................. G06F 15/62
[52] U.S. Cl. .................................... 395/128; 395/133; 395/135; 395/161; 395/164
[58] Field of Search ................................ 395/119-122, 395/133-135, 164-166; 340/706-707

[56] References Cited

U.S. PATENT DOCUMENTS

| | | | |
|---|---|---|---|
| 4,642,794 | 2/1987 | Lavelle et al. | 364/900 |
| 4,672,683 | 6/1987 | Matsueda | 340/707 X |

FOREIGN PATENT DOCUMENTS

| | | |
|---|---|---|
| 0201210 | 12/1986 | European Pat. Off. . |
| 0363204 | 4/1990 | European Pat. Off. . |

OTHER PUBLICATIONS

"Overview of PACS Activity at MGH" by R. A. Bauman et al. in the proceedings of the *10th Conference on Computer Applications in Radiology,* Anaheim, Calif., Jun. 13-16, 1990 at pp. 235-241.

"Q-RSTAR Workstations & System—Technical Overview" by J. L. Taaffe et al., in the proceedings of the *10th Conference on Computer Applications in Radiology,* at Anaheim, Calif. Jun. 13-16, 1990 at pp. 317-323.

"Q-RSTAR Digital Image Management and Transmissions" by J. L. Taaffe et al. in the proceedings of the *4th Conference on Computer Assisted Radiology,* Anaheim, Calif. Jun. 13-16, 1990 at pp. 423-438.

"Ultra-High Resolution Displays for Diagnostic Imaging" brochure by MegaScan Technology, Hopkinton, Mass. Apr. 1990.

"Video System With Real-Time Multi-Image Capability and Transparency", *IBM Technical Disclosure Bulletin,* vol. 32, No. 4B, Sep., 1989, pp. 192-193.

*Primary Examiner*—Gary V. Harkcom
*Assistant Examiner*—Almis Jankos
*Attorney, Agent, or Firm*—Hamilton, Brook, Smith & Reynolds

[57] ABSTRACT

A multiple memory display controller provides simultaneous display of overlaid image and graphic data in a computer display system. A video random access memory (RAM) in the display controller stores display data corresponding to graphics to be displayed on the computer display monitor. And a series of dynamic RAMS in the display controller stores display data corresponding to images to be displayed on the computer display monitor. A data mixer receives and mixes signals from the video RAM and one of the dynamic RAMs to form signals which are used to drive the display monitor. The signals provide graphics displayed at one resolution overlaid on images displayed at a different resolution on the monitor. A first-in first-out (FIFO) buffer and rectangle loader provide efficient loading of blocks of display data in the display controller memories.

18 Claims, 2 Drawing Sheets

COMPUTER DISPLAY APPARATUS FOR SIMULTANEOUS DISPLAY OF DATA OF DIFFERING RESOLUTION

BACKGROUND OF THE INVENTION

Resolution of each screen view of a computer display system is a function of two components. One component is the computer software which is executed by the computer and which outputs signals for the screen view. The other component is the monitor or display unit itself which receives the screen view signals from the computer. Typically a display controller is used to hold screen view signals output from the computer and to reformat and transmit the signals in a timely manner to continually refresh the display unit screen.

With the various software programs and monitors available today, different combinations of software, display controllers and display units are made. Where the software requires for its output a certain pixel resolution of the receiving screen (monitor) and the monitor has a larger pixel resolution, correction is needed. Additionally, it is often useful to be able to display very high resolution continuous tone images on a monitor, but such high resolution for displaying graphics on the same monitor is unnecessary. This is especially the case where a high resolution image display unit, for example a typical 19 inch screen of 2560 pixels by 2048 pixels, hence 200 DPI (dots per inch), and PC software, which typically requires a receiving screen pixel resolution of 75–100 DPI, are utilized together to display graphics (i.e. user editorial markings and text) overlays on grey scale or color images.

Another problem involves the demands placed on the display controller. The memory in the display controller must not only continuously refresh the monitor screen but also must have sufficient bandwidth so that new data can be loaded into the memory quickly. One solution is to employ a video-random-access-memory (VRAM) in the display controller in a wide-word dual-ported configuration. The VRAM has a memory matrix for holding data (screen view signals) and a cooperating high speed serial interface which transfers a multiplicity of pixel data at a time and frees the memory for access while simultaneously transmitting screen view signals. The VRAMs however are expensive.

Accordingly, there is a need for a computer display system that provides high resolution image display in an inexpensive, and diverse software and hardware compatible manner.

SUMMARY OF THE INVENTION

The present invention provides computer display controller apparatus which overcomes the problems of prior art. The apparatus includes a display controller coupled to the digital processor of a computer system to receive therefrom display data corresponding to elements to be displayed at different respective resolutions. The display controller has a first memory for holding display data corresponding to elements to be displayed at a certain resolution and a second or additional memory for holding display data corresponding to elements to be displayed at other resolutions.

The display controller transfers, along one channel to a data mixer, display data from the first memory, and transfers along a separate channel display data from the second memory. The data mixer combines the display data from the first and second, and additional memories to form signals for driving a display unit coupled to the display controller. Driving means drive the memories of the display controller such that each pixel of display data from one of the first and second memories at one resolution is replicated to fill several corresponding pixels of the display unit of a higher resolution. In turn, the data mixer signals drive the display unit to display, at one resolution, elements corresponding to the display data from the first memory simultaneously with elements corresponding to the display data from the second memory at a different spatial resolution.

In a preferred embodiment, the first memory of the display controller is a video RAM for holding display data corresponding to graphics to be displayed on the display unit. The graphics include user generated markings and text. The second or additional memories of the display controller are a plurality of DRAMs (Dynamic Random Access Memories) for holding display data corresponding to images to be displayed on the display unit. The images usually are displayed at a higher resolution than the graphics, the images and graphics being displayed at the same time on the display unit with the graphics usually overlapping the images.

To that end, the present invention provides display of elements corresponding to display data from one of the first and second memories of the display controller overlayed on elements corresponding to display data from the other memory. To accomplish this, the signals formed by the data mixer include signals indicating precedence of settings of display unit pixels for the overlaying elements over the settings of display unit pixels for elements corresponding to display data from the other memory.

In accordance with another aspect of the present invention, the data mixer forms signals as a function of display data from one of the first and second memories of the display controller.

In accordance with another feature of the present invention, a transfer buffer is connected between the digital processor and display controller to hold display data until times of retrace of the display unit. During times of retrace of the display unit, the transfer buffer transfers display data to the display controller. In a preferred embodiment, the transfer buffer is a first-in first-out buffer.

In a preferred embodiment, a rectangle loader is connected between the digital processor and the display controller for providing indications of memory addresses for blocks of display data from the digital processor to the display controller. The rectangle loader enables transferring of display data from the transfer buffer to the display controller in either a page mode or on a static column cycle.

Further, the display unit may be operated in either page mode or on a static column cycle with signals from the data mixer to display the elements.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1A:
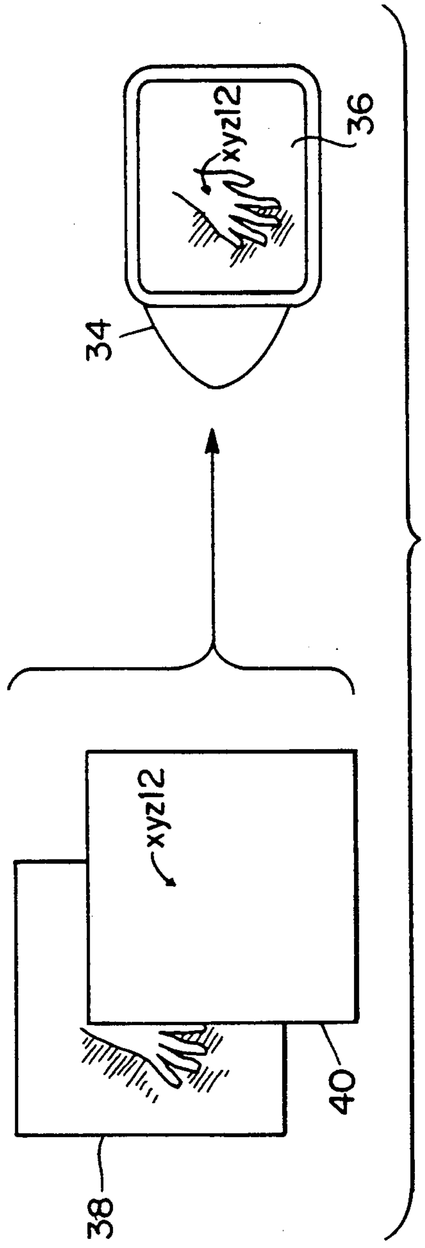
FIG. 1*a* is a schematic illustration of an image plane and a graphics plane in a display system of the present invention.

The present invention provides for the high resolution display of an image on a monitor or display unit 34 (FIG. 1*a*) of a computer system simultaneously with the lower spatial resolution display of graphics on the monitor screen. This is accomplished by employing a high resolution image plane 38 separate from a lower resolution graphic plane 40 as illustrated in FIG. 1*a*. The graphic plane 40 is expanded and logically positioned in front of the image plane 38 such that graphics are displayed overlayed on images in a screen view 36 of the display unit 34.

Figure 1B:
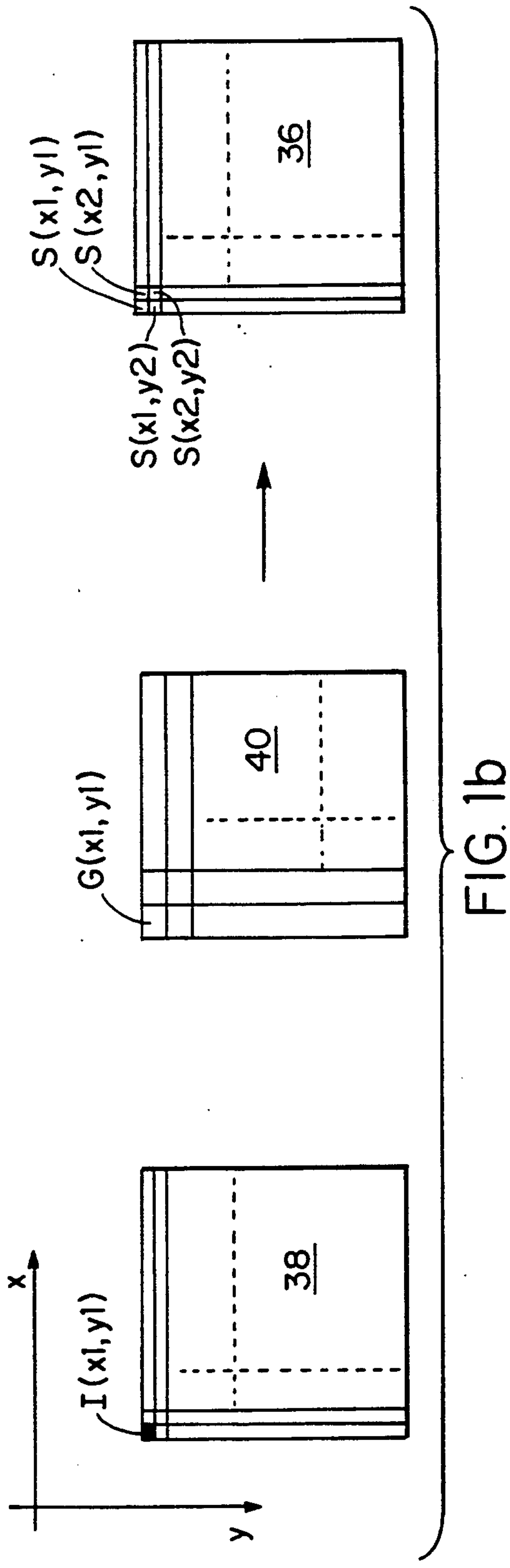
FIG. 1*b* is a diagrammatic view showing correspondence between positions on the graphics plane, image plane and screen view of FIG. 1*a*.

By way of illustration and not limitation, the screen view 36 is typically about 2.5k pixels by 2k pixels. The image plane 38 is 2.5k bits by 2k bits by 8 bits deep to support 256 gray levels. The graphic plane 40 is 1.25k bits by 1k bits by 2 bits deep to support a typical 100 DPI screen resolution. The bits of the image plane 38 have a one to one correspondence with the screen view 36 pixels, and the bits of the graphics plane 40 have a one to four correspondence with the screen view pixels as illustrated in FIG. 1*b*. Thus, the shaded bit of the image plane 38 in FIG. 1*b* denoted I(x1,y1) positionally corresponds to the screen view pixel indicated S(x1,y1). And in the graphics plane 40, the bit position labelled G(x1,y1) positionally corresponds to screen view pixels S(x1,y1), S(x2,y1), S(x1,y2) and S(x2,y2). The other bits of the image plane 38 and graphics plane 40 similarly corresponds to respective pixels of the screen view 36.

Each screen view pixel is driven by signals formed of the combination of the corresponding image plane bit and graphics plane bit as follows. For example, for each position in the image plane 38, an 8 bit signal is provided. For each position in the graphics plan 40, a 2 bit signal is provided. The 8 bit and 2 bit signals of a corresponding screen view position are logically combined to provide an output value for driving the pixel of the screen view 36 position. The 8 bit image plane 38 signal and 2 bit graphics plane 40 signal are preferably combined according to the following table where $I_0 \ldots I_7$ denotes the 8 bit signal of the image plane 38 and $G_0$, $G_1$ indicates the 2 bit signal from the graphics plane 40.

TABLE I

| Image IN | Graphics IN $G_1$, | $G_0$ | Output | |
|---|---|---|---|---|
| $I_7 \ldots I_0$ | 0 | 0 | 0 | (black) |
| $I_7 \ldots I_0$ | 0 | 1 | 127 | (grey) |
| $I_7 \ldots I_0$ | 1 | 0 | $I_7 \ldots I_0$ | (transparent/image) |
| $I_7 \ldots I_0$ | 1 | 1 | 255 | (white) |

Thus, in the preferred embodiment, it is the 2 bit signal from the graphics plane 40 which determines the setting of screen view 36 pixels. If the 2-bit graphics plane 40 signal is 00 indicating a black bit positioned on the graphics plane 40, the corresponding screen view pixel is set to 0 (black). If the 2-bit graphics plane signal is 01 indicating a gray level at the bit position in the graphics plane 40, then an output signal for a gray level, for example 127, is used to drive the corresponding screen view pixel. If the graphics plane 2-bit signal is 10 indicating a bit position of the graphics plane 40 which is to give precedence to the underlying image plane bit for that position, an output signal indicating the image plane bits $I_0$ through $I_7$ for that position is used to drive the corresponding screen view pixel. If the graphics plane signal is a 11 indicating a white bit in the graphics plane 40 then a white output value, for example, gray level 255 is used to drive the corresponding screen view pixel. In this manner, each screen view pixel is set so that the graphics of the graphics plane 40 are displayed overlaying the image of image plane 38.

Figure 2:
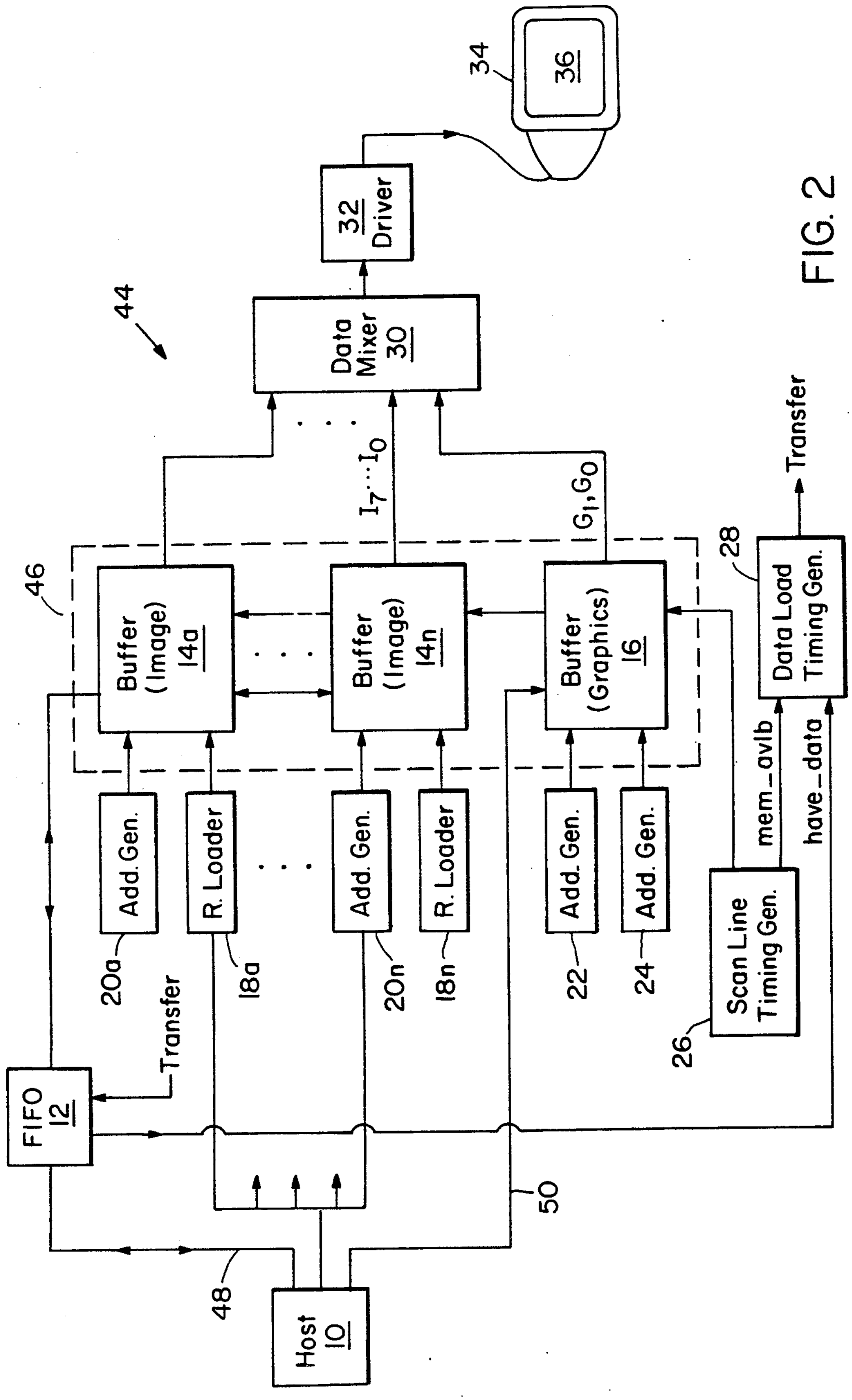
FIG. 2 is a block diagram of an embodiment of the present invention.

The foregoing is incorporated in a display system embodying the present invention as illustrated in FIG. 2. The computer display system 44 has a digital processor or host 10 which generates output to be displayed on monitor 34. Digital processor 10 may be a macrocomputer or a minicomputer or of the PC type. Monitor 34 is any video display or CRT common in the art, such as a MegaScann UHR-2007. Host 10 transmits display data on buses 48 and 50 to a multiple buffer display controller 46. The display data includes image data and graphics data. And buses 48, 50 are bidirectional as described later.

Display controller 46 employs a plurality of image buffers 14 for holding display data which corresponds to images of an image plane 38 (FIGS. 1*a*, 1*b*). Display controller 46 also employs a graphics buffer 16 for holding display data corresponding to graphics of a graphics plane 40 (FIGS. 1*a*, 1*b*). Preferably, image buffers 14 are dynamic RAMs each with at least 5 megabytes of memory, such as a Motorola 514256 DRAM. And graphics buffer 16 is a video RAM with at least one byte of memory, such as a Toshiba 524256 VRAM.

According to active scan line timing generator 26, 8-bit image signals ($I_7 \ldots I_0$) are output from image buffers 14 and 2-bit graphics signals ($G_1G_0$) are output from the graphics buffer 16 and are multiplexed in data mixer 30. The clock rate of timing generator 26 is coordinated with word width of output from buffers 14, 16 to provide data mixer 30 with appropriate amounts of image data and graphics data at a time. Address generators 20, 22 of buffers 14, 16 respectively are used to provide the proper memory address source of the image and graphics signals being output at the clocking of timing generator 26. The address generator 22 is of the type capable of (i) repeating an address to replicate a pixel of a line on the same line such that two similar pixels are adjacent each other on the line and (ii) repeating addresses to replicate a line of pixels to create two identical adjacent rows of pixels. This provides the 1 to 4 correspondence between graphics data of graphics plane 40 as held in graphics buffer 16 and pixels of screen view 36. Each pixel $G_0$ $G_1$ from the graphics buffer 16 is replicated to four pixels of the screen view.

Preferably, address generators 20 and 22 are of the Xilinx XC3030 type. Active scan line timing generator 26 is, for example, a Signetics PL10H20V or a similar type.

Data mixer 30 combines the 8-bit image signal ($I_7 \ldots I_0$) from one image buffer 14 and 2-bit graphics signal ($G_1$, $G_0$) from graphics buffer 16 which correspond to a common screen view pixel. Data mixer 30 accomplishes the combining by logic gates arranged to implement Table I described above. The resulting output signal from data mixer 30 is transferred to a display driver 32 coupled to data mixer 30. Display driver 32 employs a digital-to-analog converter to convert the data mixer output signal to a voltage signal for driving the corresponding pixel of screen view 36.

In the preferred embodiment, data mixer 30 includes a programmable logic array, such as a Signetics PL10H20V, coupled to a shift register or similar memory such as a Broaktree BT424. And display driver 32 is a Megascan serializer Ser-2007m or similar digital-to-analog converter.

The foregoing procedure is performed for each pixel of screen view 36 such that display driver 32 and display unit 34 scans and updates each line (row) of pixels of the screen view to refresh the screen view 36.

In the preferred embodiment, active scan line timing generator 26 clocks the buffers 14 and 16 of display controller 46 such that display data for driving the screen view 36 is output during active scan line times of display unit 34. During retrace time of display unit 34 (i.e. retrace between lines of pixels as well as from the last line of pixels back to the first line of pixels in screen view 36), a data loading timing generator 28 enables the transfer of image data between host 10 and image buffers 14. This is accomplished as follows.

During times of retrace, active scan line timing generator 26 disables the output of image and graphics data signals from the memories 14, 16 of display controller 46 and transmits a signal (mem_avlb) indicating availability of the display controller memories 14, 16 to data loading timing generator 28. That signal is logically ANDed with a signal (have_data) from a transfer buffer 12 which indicates that image data from either host 10 or an image buffer 14 is currently being held in the transfer buffer 12. For the case where the resulting signal indicates that the display driver 32 is currently in a state of retrace (i.e. it is currently retrace time) and that transfer buffer 12 is currently holding subject data, the data loading timing generator 28 enables transfer buffer 12 to transfer the subject data to the desired destination (i.e. either an image buffer 14 or host 10). Data loading timing generator 28 is preferably a Signetics PLS105 programmable logic array programmed to implement an AND gate and other logic. Other state machines which produce the transfer signal upon the receipt of the mem_avlb and have_data signals together are also suitable.

In a preferred embodiment, transfer buffer 12 is a first-in first-out buffer of 1024 bytes of memory, and bus 48 is a bidirectional 32 bit wide bus. To that end, transfer buffer 12 transfers image data from host 10 to an image buffer 14 or vice versa during retrace times of display unit 34. This allows time saving transfer of image data between display and other host applications.

Also, host 10 transmits display data corresponding to graphics to buffer 16 over bidirectional bus 50. Since buffer 16 is a VRAM, host 10 can get immediate access to buffer 16 the majority of the time. Host access address generator 24 provides host 10 with the address of the available memory space in buffer 16. And scan line timing generator 26 mem_avlb signal enables host 10 to transmit display data.

For further efficiency in loading display data into image buffers 14 of display controller 46, the present invention employs rectangle loaders 18. There is a different rectangle loader 18 for each image buffer 14. To transfer a block of image data to an image buffer 14, host 10 provides an indication of the extent of the block of display data. Preferably, an indication of the upper left hand corner and lower right hand corner of the block of image data is used. Upon the clocking of data loading timing generator 28, rectangle loader 18 cooperates with buffer 12 to load the subject block of image data into a corresponding image buffer 14 in a static column cycle or page mode as known in the art. Briefly, these two modes allow, for each row address, a series of column addresses and column strobes to load the block of data into image buffer 14. In turn, this reduces the loading time where a row address does not have to be separately given for each column address.

In a preferred embodiment, rectangle loaders 18 are Xilinx XC3030 address generators. Other address generators of a similar type are suitable.

Also as is common in the art, the page mode or static column cycle manner of displaying a block of data on the monitor 34 may be employed by display driver 32. Thus, efficiency is provided in both loading of image data into image buffers 14 as well as displaying image data on monitor 34.

While the invention has been particularly shown and described with reference to a preferred embodiment thereof, it will be understood by those skilled in the art that various changes in form and details may be made therein without departing from the spirit and scope of the invention as defined by the appended claims. For example, the relative resolution between graphics plane 40 and image plane 38 and, hence, displayed graphics and images may be other than 1 to 4 described above for purposes of illustration and not limitation.

I claim:

1. In a computer system having (i) a digital process and (ii) a display unit, display apparatus for receiving display data from the digital processor and for displaying on the display unit a screen view formed from the display data, the apparatus comprising:

a display controller coupled to the digital processor, the display controller receiving display data from the digital processor, and the display controller having (a) a first memory for storing display data for forming a first screen view displayed at a first spatial resolution, and (b) at least a second memory for storing display data for forming a second screen view displayed at a second spatial resolution, the first and second spatial resolutions differing from each other, and the display data received from the digital processor and stored in one of the memories of the display controller comprising a multiplicity of data pixels and each screen view comprising a multiplicity of display unit pixels;

means for outputting and converting the display data in the memories of the display controller into screen view, for each data pixel of display data from the first memory, the data pixel is repeated to form a group of display unit pixels, such that for each data pixel of display data a respective group of display unit pixels is formed; and a data mixer coupled between the display controller and the display unit, the data mixer receiving display data from the first and second memories of the display controller, the data mixer forming output signals by multiplexing the display data received from the first and second memories, the output signals for setting display unit pixels such that the first screen view corresponding to the display data from the first memory is displayed on the display unit at the first spatial resolution and the second screen view corresponding to display data from the second memory is displayed on the display unit simultaneously with the display of the first screen view and superimposed over the first screen view but at the second spatial resolution.

2. Apparatus as claimed in claim 1 wherein the data mixer forms output signals for displaying the first and second screen view according to the display data of one of the memories.

3. Apparatus as claimed in claim 1 wherein:

the data mixer multiplexes display data from the first and second memories according to a predetermined precedence of one of the first and second screen views over the other of the first and second screen views, such that the screen view predetermined to take precedence is displayed on the display unit as being superimposed over the other of the first and second screen views.

4. Apparatus as claimed in claim 1 wherein the first memory of the display controller is a video random access memory for storing display data representing graphical elements forming the first screen view, and the second memory of the display controller is a dynamic random access memory for storing display data representing image elements forming the second screen view.

5. Apparatus as claimed in claim 1 wherein the display unit has periods of active scanline time in which the display unit scans and updates lines of display unit pixels of a displayed screen view, and the display unit has a time of retrace between each period of active scan line time; and the apparatus further comprising a first-in-first-out buffer connected between the digital processor and the display controller to hold display data until a time of retrace of the display unit, the first-in-first-out buffer transferring display data to the display controller during times of retrace of the display unit.

6. Apparatus as claimed in claim 5 further comprising loader means connected between the digital processor and the display controller, the loader means generating addresses of rectangle blocks of display data from the digital processor and transferring said rectangle blocks of display data to the display controller.

7. Apparatus as claimed in claim 5 further comprising loader means connected between the digital processor and display controller, the loader means transferring display data from the first-in-first-out buffer to the display controller, in one of page mode and static column cycle.

8. Apparatus as claimed in claim 1 further comprising means for operating the display unit in one of page-mode and static-column cycle, in response to output signals from the data mixer, to simultaneously display the first and second screen views.

9. In a computer system having (i) a digital processor and (ii) a display unit coupled to the digital processor, a method of simultaneously displaying on the display unit screen views of different respective resolutions, each screen view generated from display data output by the digital processor, the method comprising the steps of:

providing a display controller having (i) a first memory for storing display data corresponding to screen views to be displayed at a first spatial resolution, and (ii) at least a second memory for storing display data corresponding to screen views to be displayed at a second spatial resolution;

coupling the display controller to the digital processor such that the display controller receives display data from the digital processor, the display data comprising a multiplicity of data pixels, and each screen view comprising a multiplicity of display unit pixels;

outputting and converting display data in the memories of the display controller in a manner such that for each data pixel of display data from the first memory, the data pixel is repeated to form a respective group of display unit pixels, a respective group of display unit pixels being formed for each data pixel of display data from the first memory;

coupling a data mixer between the display controller and the display unit;

in the data mixer receiving display data from the first and second memories; and in the data mixer, forming output signals by multiplexing the display data received from the first and second memories, the output signals for setting display unit pixels such that the first screen view corresponding to the display data from the first memory is displayed on the displayed unit at the first spatial resolution, and the second screen view corresponding to the display data from the second memory is displayed on the display unit simultaneously with the display of the first screen view and superimposed over the first screen view, but at the second spatial resolution.

10. A method as claimed in claim 9 wherein the step of providing a display controller includes providing a display controller having a video random access memory for a first memory and a dynamic random access memory for the second memory, the video random access memory storing display data representing graphic elements forming the first screen view, and the dynamic random access memory storing display data representing image elements forming the second screen view.

11. A method as claimed in claim 9 wherein:

the display unit has periods of active scanline time in which the display unit scans and updates lines of display unit pixels of a displayed screen view, and the display unit has a time of retrace between each period of active scan line time; and the step of coupling the display controller to the digital processor includes connecting a buffer between the digital processor and display controller to hold display data until a time of retrace of the display unit, the buffer transferring display data to the display controller during times of retrace of the display unit.

12. A method as claimed is claim 11 wherein the step of connecting a buffer between the display controller and digital processor includes providing a loader means coupled between the display controller and digital processor, the loader means transferring display data from the buffer to the display controller in one of a page mode and a static column cycle.

13. A method as claimed is claim 9 wherein the step of coupling the display controller to the digital processor includes providing loader means coupled between the digital processor and display controller, the loader means generating addresses of rectangle blocks of display data form the digital processor and transferring said rectangle blocks of displayed data to the display controller.

14. A method as claimed is claim 9 further comprising the step of driving the display unit in one of page mode and static column cycle, in response to output signals from the data mixer, to simultaneously display the first and second screen views.

15. Display apparatus for receiving display data for forming screen views of respective different spatial resolutions and for displaying the screen views at respective different resolutions on a display unit, the apparatus comprising:

a digital processor for transmitting display data comprising a multiplicity of data pixels;

a display controller corrected to the digital processor, the display controller receiving display data from the digital processor, the display controller having (i) a video random access memory for restoring display data representing graphical elements forming a first screen view to be displayed at a first spatial resolution on a display unit, and (ii) a plurality of dynamic random access memories for storing display data representing image elements forming working screen views to be displayed at a second spatial resolution on the display unit, each screen view comprising a multiplicity of display unit pixels, the display unit having periods of active scan line time in which the display unit scans and updates lines of display unit pixels of a displayed screen view, and the display unit having a time of retrace between each period of active scan line time;

a buffer connected between the digital processor and the display controller for storing display data transmitted from the digital processor, the buffer storing display data until times of retrace of the display unit, the buffer transferring display data to the display controller during times of retrace of the display unit;

means for outputting and converting the display data in the memories of the display controller such that each data pixel of display data from the video random access memory is repeated for form a respective group of display unit pixels, a respective group of display unit pixels being formed for each data pixel of display data from the video random access memory; and a data mixer coupled between the display controller and the display unit, the data mixer receiving display data from the memories of the display controller, the data mixer forming output signals by multiplexing the display data from the video access memory and the display data from one dynamic random access memory, the output signals for setting display unit pixels such that the first screen view corresponding to the display data from the video random access memory is displayed on the display unit at the first spatial resolution and one working screen view corresponding to the display data from one dynamic random access memory is displayed on the display unit simultaneously with the display of the first screen view and superimposed over the first screen view, but at the second spatial resolution.

16. Display apparatus as claimed in claim 15 further comprising loader means connected between the digital processor and the display controller, the loader means generating addresses of rectangle blocks of display data from the digital processor and transferring said rectangle blocks of display data to the display controller.

17. Display apparatus as claimed in claim 15 further comprising loader means connected between the digital processor and the display controller, the loader means transferring display data from the buffer to the display controller in one of a page mode and a static column cycle.

18. Display apparatus as claimed in claim 15 wherein the buffer connected between the digital processor and display controller is a first-in first-out buffer.

* * * * *

UNITED STATES PATENT AND TRADEMARK OFFICE

CERTIFICATE OF CORRECTION

PATENT NO. : 5,179,639

DATED : January 12, 1993

INVENTOR(S) : James L. Taaffe

It is certified that error appears in the above-identified patent and that said Letters Patent is hereby corrected as shown below:

Column 6, Claim 1, line 1 of that claim after "digital" change "process" to read ---processor---.

Column 9, Claim 15, lines 11 and 12 of that claim after "for" change "re-storing" to read ---storing---.

Column 10, Claim 15, line 36 of that claim after "repeated" change "for" to read ---to---.

Column 10, Claim 15, line 45 of that claim after "video" insert ---random---.

Signed and Sealed this

Seventh Day of December, 1993

Attest:

BRUCE LEHMAN

Attesting Officer

Commissioner of Patents and Trademarks